(12) United States Patent
Andrews

(10) Patent No.: US 10,837,193 B2
(45) Date of Patent: Nov. 17, 2020

(54) LEVER LOCK POST HOLDER

(71) Applicant: FIAT LUX PHOTONICS Inc., Berkeley, CA (US)

(72) Inventor: David Scott Andrews, Berkeley, CA (US)

(73) Assignee: FIAT LUX PHOTONICS LLC, Berkeley, CA (US)

( * ) Notice: Subject to any disclaimer, the term of this patent is extended or adjusted under 35 U.S.C. 154(b) by 186 days.

(21) Appl. No.: 16/237,731

(22) Filed: Jan. 1, 2019

(65) Prior Publication Data

US 2019/0218812 A1    Jul. 18, 2019

Related U.S. Application Data

(60) Provisional application No. 62/617,546, filed on Jan. 15, 2018.

(51) Int. Cl.
| | | |
|---|---|---|
| *E04H 12/22* | (2006.01) | |
| *F16B 2/18* | (2006.01) | |
| *E02D 27/42* | (2006.01) | |
| *F16B 7/14* | (2006.01) | |

(52) U.S. Cl.
CPC ......... *E04H 12/2276* (2013.01); *E02D 27/42* (2013.01); *F16B 2/185* (2013.01); *F16B 7/1454* (2013.01)

(58) Field of Classification Search
CPC .......... G02B 7/026; G02B 7/02; G02B 7/022; G02B 7/14
USPC ........................................... 359/818
See application file for complete search history.

(56) References Cited

U.S. PATENT DOCUMENTS

| | | | | |
|---|---|---|---|---|
| 5,039,043 A | * | 8/1991 | Hodge | B01L 9/00 248/125.8 |
| 2013/0301148 A1 | * | 11/2013 | Breidenthal | G02B 7/02 359/819 |
| 2015/0131175 A1 | * | 5/2015 | Lamontagne | G02B 7/026 359/830 |

* cited by examiner

*Primary Examiner* — Mohammed A Hasan
(74) *Attorney, Agent, or Firm* — Patent Office of Chung Park

(57) ABSTRACT

A post holder for holding a post in place. The post holder includes: a casing including a hollow cylinder and a clamping flag defined by a cutout formed in the hollow cylinder; first and second brackets detachably secured to the casing; a cylindrical rod disposed between the first and second brackets and secured to the first and second brackets; and a levered cam disposed between the first and second brackets and having a shape of a comma that includes a tail and a circular disk. The circular disk has a hole that the cylindrical rod passes through, where the hole is offset from a center of the circular disk so that a level of a clamping force that the circular disk applies to the clamping flag changes as the levered cam rotates relative to the casing.

17 Claims, 11 Drawing Sheets

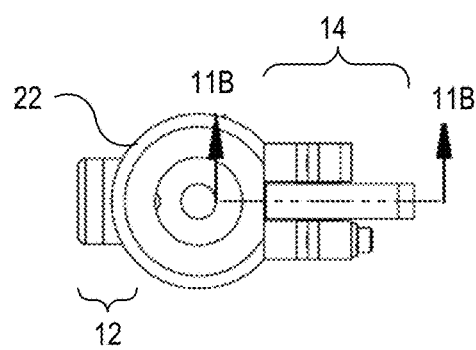
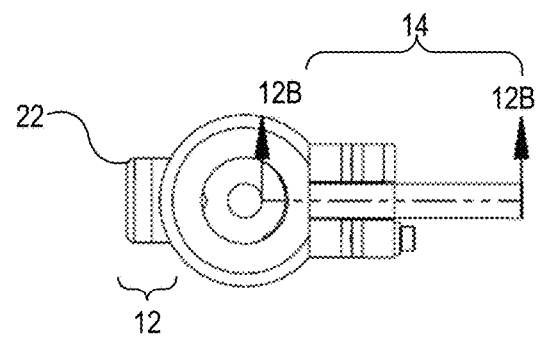
FIG. 11A  FIG. 12A
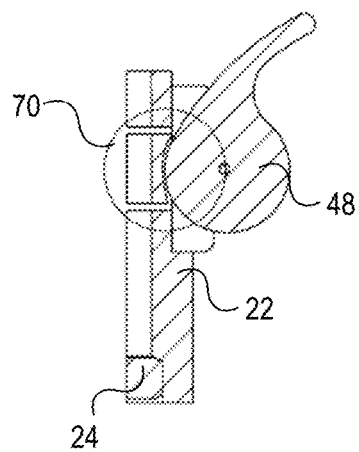
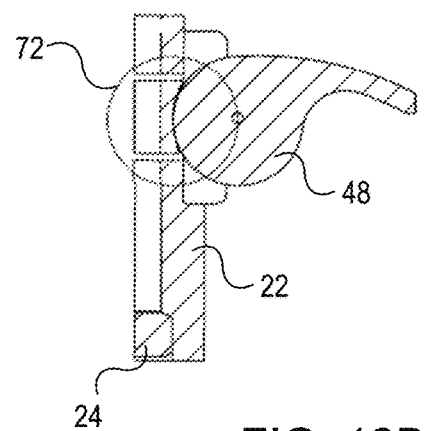
FIG. 11B  FIG. 12B
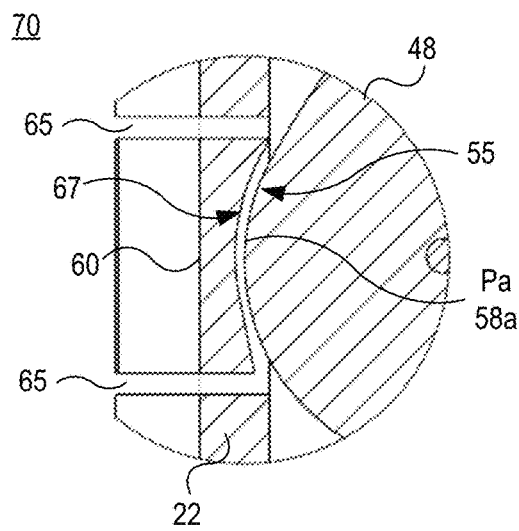
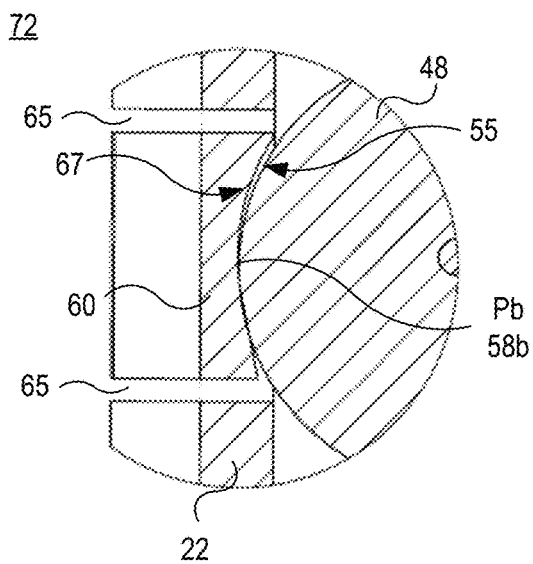
FIG. 11C  FIG. 12C

LEVER LOCK POST HOLDER

CROSS-REFERENCE TO PRIOR APPLICATIONS

This application claims priority of U.S. Provisional Patent Application No. 62/617,546, filed on Jan. 15, 2018, which is all hereby incorporated by reference in its entirety.

BACKGROUND

A. Technical Field

The present invention relates to apparatus for adjustably mounting optical elements, and more particularly, to post holders that holds posts for optical elements in place.

B. Background of the Invention

FIG. 1A shows a conventional post holder 100 having a locking thumb screw 104. FIG. 1B shows a perspective view of the conventional post holder 100 in FIG. 1A. FIG. 1C shows a top view of the conventional post holder 100 in FIG. 1A, where the locking thumb screw is in contact with post 120. As depicted, the conventional locking thumb screw post holder 100 has an aluminum tube/casing 102 with outer diameter of around 1 inch. Typically, the inner diameter is slightly larger than 0.50 inch, allowing a 0.50 inch post 120 to slide in the tube. At the bottom, there is ether a tapped hole that accommodates a fastener, such as a ¼-20 or M6 socket head cap screw, where the fastener secures the post holder to several different bases or a built-in base. Near the top of the post holder tube 102 is a threaded hole (usually a ¼-20 tapped hole), where the threads 108 of the locking thumb screw 104 engages the threaded hole. There are several variations on the locking thumb screw 104, where all of them start with a screw head 106 that is large enough to be turned by fingers (AKA a thumb screw). Some have a 3/16 hex socket 107 enabling the use of a 3/16 hex wrench for added clamping force. In another example, the locking thumb screw 104 may have a spring loaded plunger 109 that can provide some holding friction before the ridge 122 of the thumb screw 104 makes contact with the post 120.

In general, the conventional locking thumb screw post holder 100 has operational problems: 1) Either there is no friction on the post 120 until it is locked in place by the screw end or, in the case of the spring loaded plunger locking thumb screw, the friction that is applied varies as the operator turns the thumb screw but does not lock the post until the screw body makes contact with the post. 2) The operator cannot determine whether the post 120 is loose or locked in place by visual inspection. 3) If the post 120 is locked, the operator cannot tell whether or not the thumb screw 104 is applying sufficient force to hold the post 120 firmly in place. 4) When locking the post 120 (as indicated by the arrow 110), the thumb screw 104 can rotate the post 120 (as indicated by arrows 112 and 114), resulting in unintentional misalignment of an optic element disposed at the top of the post 120. 5) When locking the post 120, the thumb screw 104 can scratch the post 120, making it hard to move the post inside the tube 102 next time. 6) Since the ridge 122 of the thumb screw 104 making contact with the post 120 is small, a large amount of force must be applied to lock the post firmly. In the case where a 3/16 hex wrench is used to lock the post 120, the same drive is needed to loosen the pressure on the post 120 and there is no way to know that except trying to loosen by hand. 7) It may take several turns of the thumb screw 104 to lock the post 120, depending on how many turns were used to loosen it.

Another conventional post holder is disclosed in the U.S. Pat. No. 5,140,470, where some of issues listed above are resolved but others are created and not all the issues with the locking thumb screw 100 are resolved. The New Focus⁷9601™ post holders, which are manufactured by Newport Corporation in Irvine, Calif., have the features disclosed in the '470 patent. The post holder described in the '470 patent (hereinafter "'470 holder") locks the post and provides optic positioning friction differently from the post holder 100. Instead of having a locking thumb screw, the '470 holder has a locking arm which, on the top, has a right angle protrusion that ends with a 0.5 inch cylindrical concave surface designed to clamp against the post. Also, the ~1.25 inch long arm, when a post is inserted, runs almost parallel to the longitudinal axis of the post holder tube. Not far from the protrusion is a pivot point, and a spring provides steady friction on the post when inserted. Finally, toward the bottom of the locking arm, there is a tapped hole in which a thumb screw is inserted, allowing the operator to lock the post when the optic is at the desired location.

Applying inward pressure on the locking arm (typically from the operator's fingers) relieves pressure (friction) on the post from the spring on the arm or a thumb screw that provides clamping pressure on the post. This "cam lock" design of the '470 holder has several advantages over the locking thumb screw 100, including: 1) the larger clamping area and mechanical advantage from the lever arm provide a more secure locking without the need for a tool; and 2) the locking arm will not scratch or rotate the post during locking. However, the cam lock design has some disadvantages not found on the locking thumb screw holder 100, such as: 1) when inserting a post, the operator has to loosen the locking screw and then hold the clamping arm down with one hand and insert the post with the other hand (i.e., two hands are needed); 2) since the spring on the locking arm is what is providing friction to the post, the post friction would be released if the operator inadvertently puts any inward pressure on the arm while turning the thumb screw; and 3) there is a nonadjustable holding friction on the post set by the manufacturer.

Moreover, the '470 holder shares many disadvantages with the locking thumb screw holder 100: 1) just like the locking thumb screw holder, the operator cannot tell if the post is locked just by visual inspection; and 2) it may take several turns of the thumb screw to make contact and lock the post. As such, it would be desirable to provide post holder apparatus having an improved locking mechanism and adjustable holding/positioning friction independent of the locking mechanism that resolves the disadvantages of the conventional post holders.

SUMMARY OF THE DISCLOSURE

In one aspect of the present invention, a post holder includes: a casing including a hollow cylinder and a clamping flag defined by a cutout formed in the hollow cylinder; first and second brackets secured to the casing using socket head cap screws; a cylindrical rod or axle extending between the first and second brackets and passing through the pivot hole on a levered cam, where the levered cam has a shape of a comma that includes a tail and a circular disk. The circular disk has a hole that the cylindrical rod passes through, where the pivot hole is offset from a center of the circular disk so that a level of a clamping force that the circular disk applies to the clamping flag changes as the levered cam rotates relative to the casing.

In another aspect of the present invention, a post holder includes: a casing including a hollow cylinder for receiving a post therein and having a tapped hole that is located close to the opening for inserting the post but arranged perpendicular to the post; and an adjustable friction assembly for applying a frictional holding/positioning force to the post. The adjustable friction assembly is secured to the casing and includes: a main body engaging the tapped hole and having a through hole extending longitudinally to create a hollow inside-and-outside threaded cylinder; a steel ball disposed in the through hole; a spring disposed in the through hole and configured to push the ball in the radial direction so that the ball applies the frictional force; and a jam nut detachably secured to the main body and compressing the spring, wherein a location of the jam nut relative to the main body controls a level of the frictional force. Finally a hole is tapped in the flared head portion of the main body to receive a nylon tipped set screw, where the nylon tipped set screw makes contact with the jam nut and insures the jam nut dose not back out due to the pressure of the spring and or vibrations experienced during normal operation.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 11A shows a top view of a post holder in a release position according to embodiments of the present disclosure.

FIG. 11B shows a cross sectional view of the post holder in FIG. 11A, taken along the line 11B-11B, according to embodiments of the present disclosure.

FIG. 11C is an enlarged view of a portion of the post holder in FIG. 11B according to embodiments of the present disclosure.

FIG. 12A shows a top view of a post holder in an engaging position according to embodiments of the present disclosure.

FIG. 12B shows a cross sectional view of the post holder in FIG. 12A, taken along the line 12B-12B, according to embodiments of the present disclosure.

FIG. 12C is an enlarged view of a portion of the post holder in FIG. 12B according to embodiments of the present disclosure.

DETAILED DESCRIPTION OF THE PREFERRED EMBODIMENTS

Figure 1A:
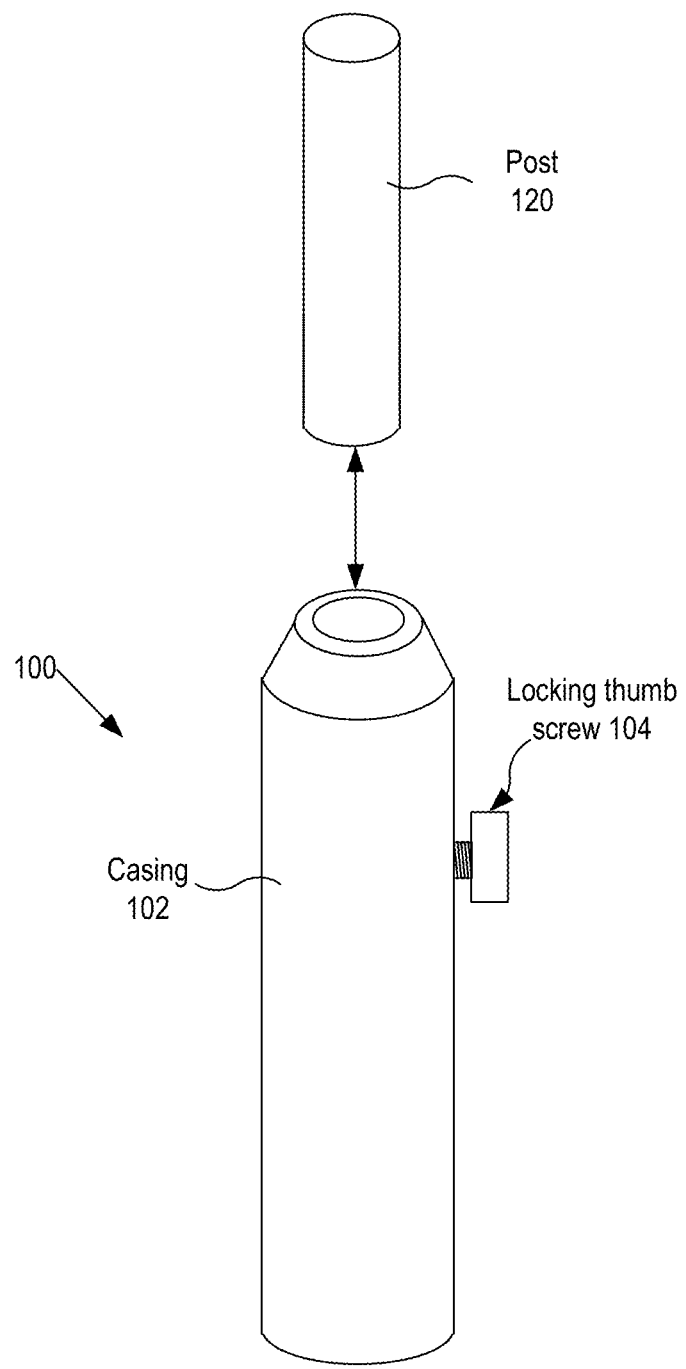
FIG. 1A shows a perspective view of a conventional post holder.
Figure 1B:
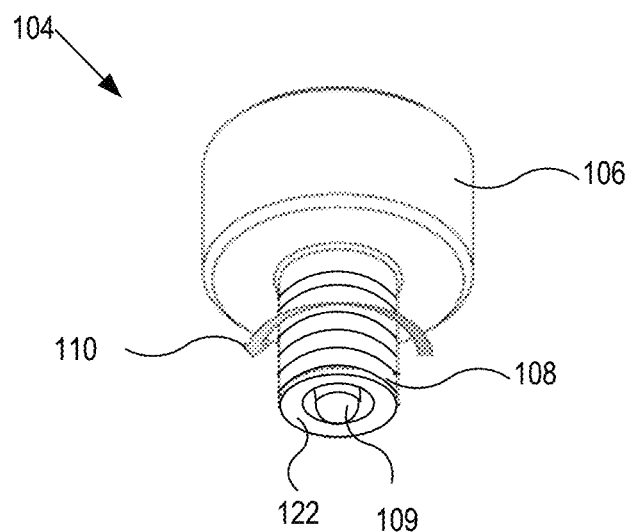
FIG. 1B shows a perspective view of the locking thumb screw of the conventional post holder in FIG. 1A.
Figure 1C:
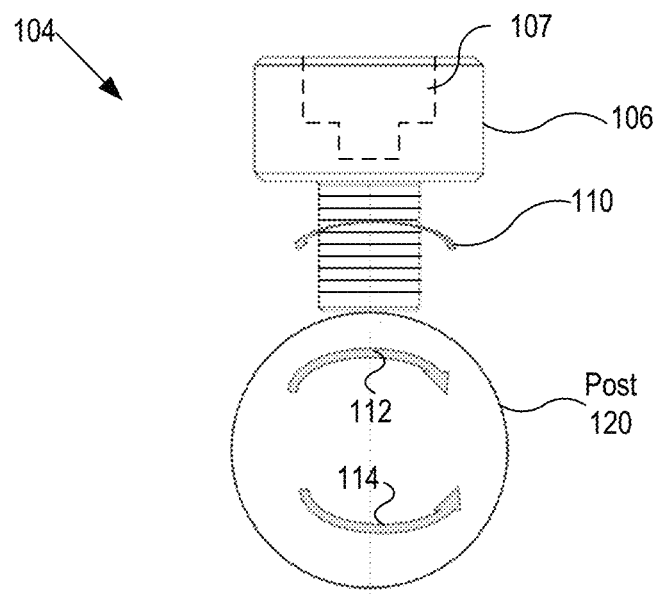
FIG. 1C shows a top view of the conventional post holder in FIG. 1A, where the locking thumb screw is in contact with a post.

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment. In the present drawings, like reference numeral designates like or corresponding parts throughout the several views.

Figure 2:
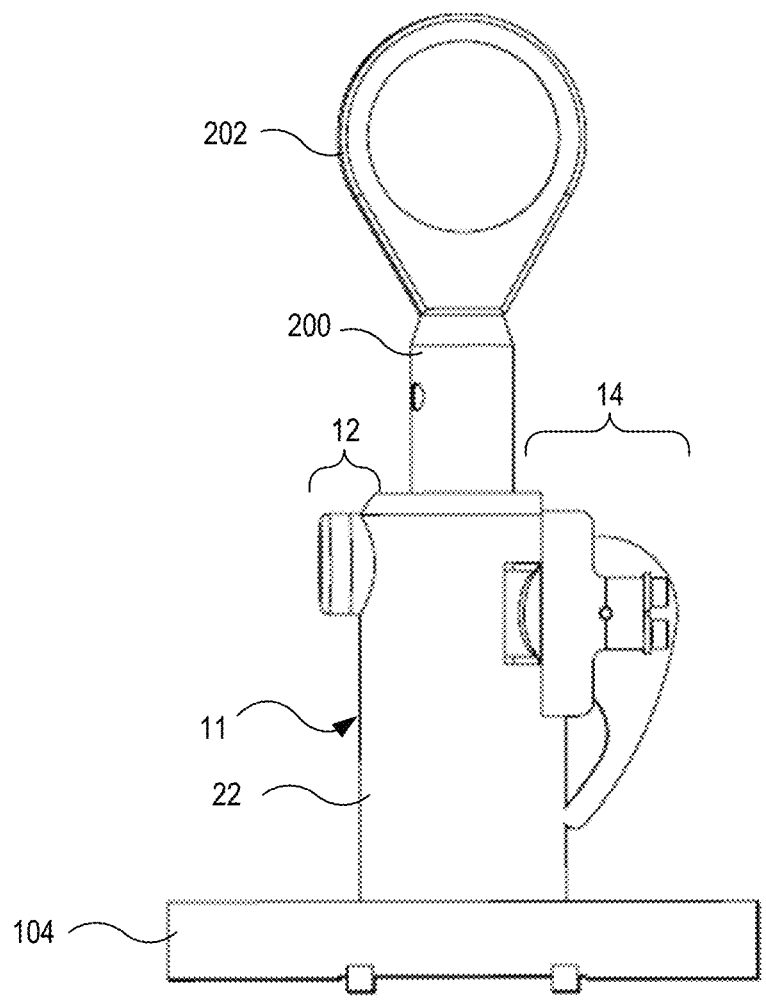
FIG. 2 shows a front view of a post holder that holds a post according to embodiments of the present disclosure.

FIG. 2 shows a front view of a Lever Lock Post Holder (LLPH, or shortly post holder) 11 for holding a post/rod 200 according to embodiments of the present disclosure. As depicted, the post holder 11 may include: a casing 22 having an axial cylindrical hole with a distal opening; an adjustable constant friction assembly (or shortly adjustable friction assembly) 12 secured to the casing 22; and a levered cam assembly 14 secured to the casing 12. In embodiments, the adjustable friction assembly 12 and the levered cam assembly 14 may be two separate clamping mechanisms for holding a post 200 in place. In embodiments, the post/rod 200 may be received through the distal opening of the casing 22, where the post/rod 200 may be used to hold an optical device, such as lens holder 202. In embodiments, the casing 22 may generally have a shape of hollow cylinder (or tube) and be formed of aluminum.

Figure 3:
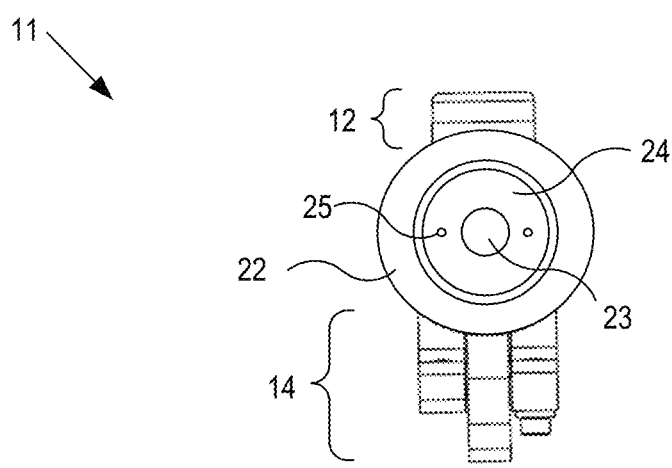
FIG. 3 shows a bottom view of a post holder according to embodiments of the present disclosure.

FIG. 3 shows a bottom (or equivalently proximal end) view of the post holder 11 according to embodiments of the present disclosure. As depicted, a bottom plug 24 may be disposed at the proximal end of the casing 22 and have a male (or female) thread (not shown in FIG. 3) that engages the female (or male) thread formed in the casing 22. In embodiments, the bottom plug 24 may be formed of brass. In embodiment, the bottom plug 24 may have two holes 25 for a spanner drive that the operator may use to mount/dismount the bottom plug 24 from the casing 22. In embodiments, the bottom plug 24 may have a tapped mounting hole 23, through which a fastener that secures the post holder 11 to another object, such as a base plate 104, is received.

Figure 4:
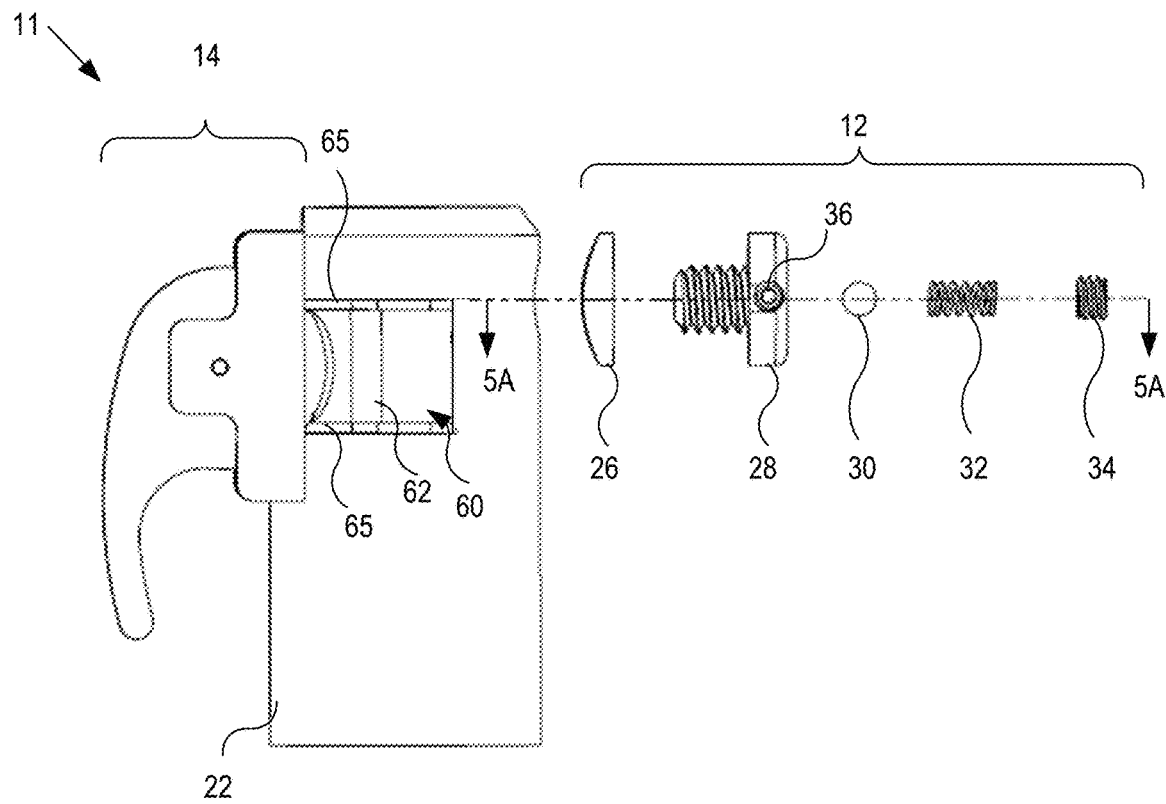
FIG. 4 shows a rear view of a post holder, where an adjustable friction assembly is in an exploded view according to embodiments of the present disclosure.
Figure 5A:
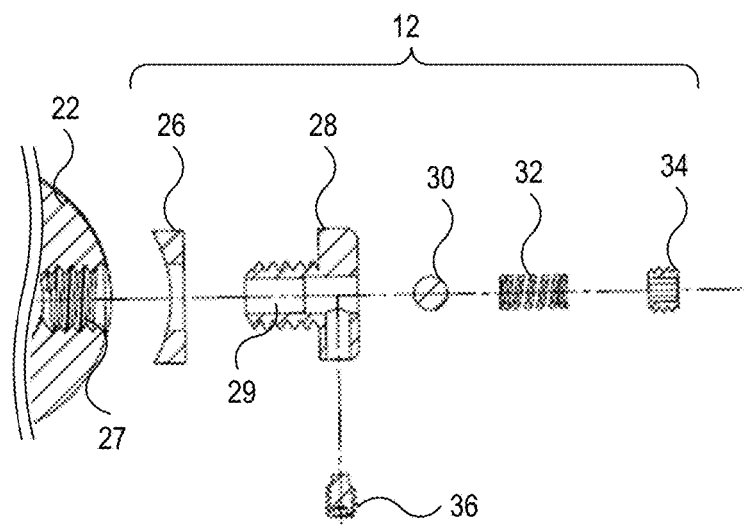
FIG. 5A shows a cross sectional view of a portion of the post holder in FIG. 4, taken along the line 5A-5A, according to embodiments of the present disclosure.
Figure 5B:
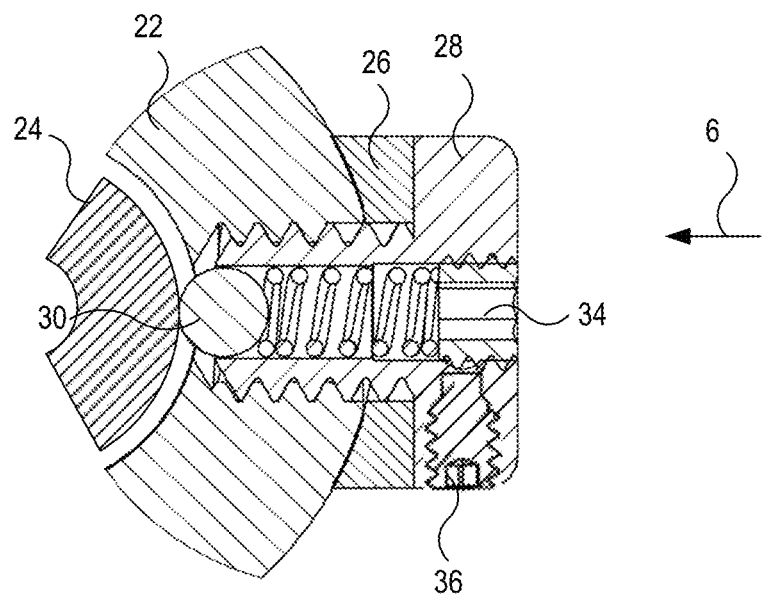
FIG. 5B shows a cross sectional view of a portion of the post holder in FIG. 4, taken along the line 5A-5A, where an adjustable friction assembly is mounted on a casing according to embodiments of the present disclosure.
Figure 6:
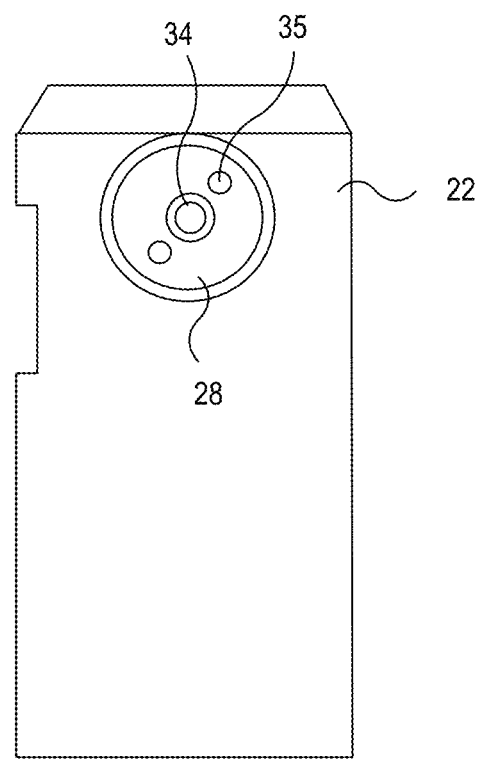
FIG. 6 shows a side view of the post holder in FIG. 4, taken along the direction 6, according to embodiments of the present disclosure.

In embodiments, the levered cam assembly 14 does not provide any holding friction on the post 200 when the levered cam is in the release position (as shown in FIG. 11A-11C). In embodiments, in such a case, the adjustable friction assembly 12 may apply a constant frictional force to the post 200 so as to hold the post. In embodiments, the level of friction may be adjusted for different weights of the mount/component 202 and be intended to allow the operator to easily move the mount 202 by hand and hold it still for long enough to observe the results of the movement and then lock the post in place with assembly 14. In embodiments, the adjustable friction assembly 12 may allow the operator to control the level of frictional force applied to the post 200. FIG. 4 shows a rear view of the post holder 11, where an adjustable friction assembly 12 is in an exploded view according to embodiments of the present disclosure. FIG. 5A shows a cross sectional view of a portion of the post holder 11 in FIG. 4, taken along the line 5A-5A, according to embodiments of the present disclosure. FIG. 5B shows a cross sectional view of a portion of the post holder 11 in FIG. 4, taken along the line 5A-5A, where the adjustable friction assembly 12 is mounted on the casing 22 according to embodiments of the present disclosure. FIG. 6 shows a side view of the post holder 11 in FIG. 4, taken along the direction 6 according to embodiments of the present disclosure.

As depicted in FIGS. 4-6, the adjustable friction assembly 12 may include: a concave spacer 26 having a curvature that conforms to the outer surface of the casing 22; a main body 28 of the assembly 12 having a through hole 29 and a thread that engages the counterpart thread formed in a tapped hole 27 of the casing 22; a ball 30 installed inside the through hole 29; a compression spring 32 installed inside the through hole 29; a jam nut 34 having a thread that detachably engages the counterpart thread formed in the main body 28; and a locking set screw 36 having a thread that detachably engages the counterpart thread formed in the main body 28. In embodiments, the concave spacer 26, main body 28, ball 30, compression spring 32, and jam nut 34 may be formed of aluminum, stainless steel, low carbon steel, music wire, and stainless steel, respectively. However, it should be apparent to those of ordinary skill in the art that these components may be formed of other suitable materials.

In embodiments, the tapped hole 27 may have a tapered end so that the ball 30 may not come out when no post is present in the post holder 11. When the post 200 is present in the post holder, the spring 32 may push the ball 30 against the post 200 to thereby apply a constant frictional force to the post 200. In embodiments, the compressive force in the spring 32 may be adjusted by changing the position of the jam nut 34 relative to the main body 28, i.e., the operator may adjust the frictional force applied to the post 200 by simply changing the number of turns of the jam nut 34.

In embodiments, the locking nylon tip set screw 36 may be used to secure the position of the jam nut 34 relative to the main body 28, preventing the jam nut 34 from backing out and obviating a potential unwanted reduction in holding friction. In embodiments, the locking set screw 36 may be a nylon tip set screw and tightened against the jam nut 34 so as to insure that the jam nut 34 does not back out due to the pressure of the spring 32 or vibrations experienced during normal operation. In embodiments, each of the jam nut 34 and set screw 36 may have a hex socket formed therein.

In embodiments, the adjustable friction assembly 12 may provide a constant friction on the post, where the friction can be set and locked by the operator. This adjustable constant friction may allow the operator to mount a range of different weight items atop the post 200, position the mounted item in height (vertical displacement) and yaw (horizontal rotation) and then let go of the post, leaving the positioned item to stay in place by the constant friction until locked or moved. In embodiments, the main body 28 may have two holes 35 for a spanner drive that the operator may use to mount/dismount the main body 28 from the casing 22.

Figure 7:
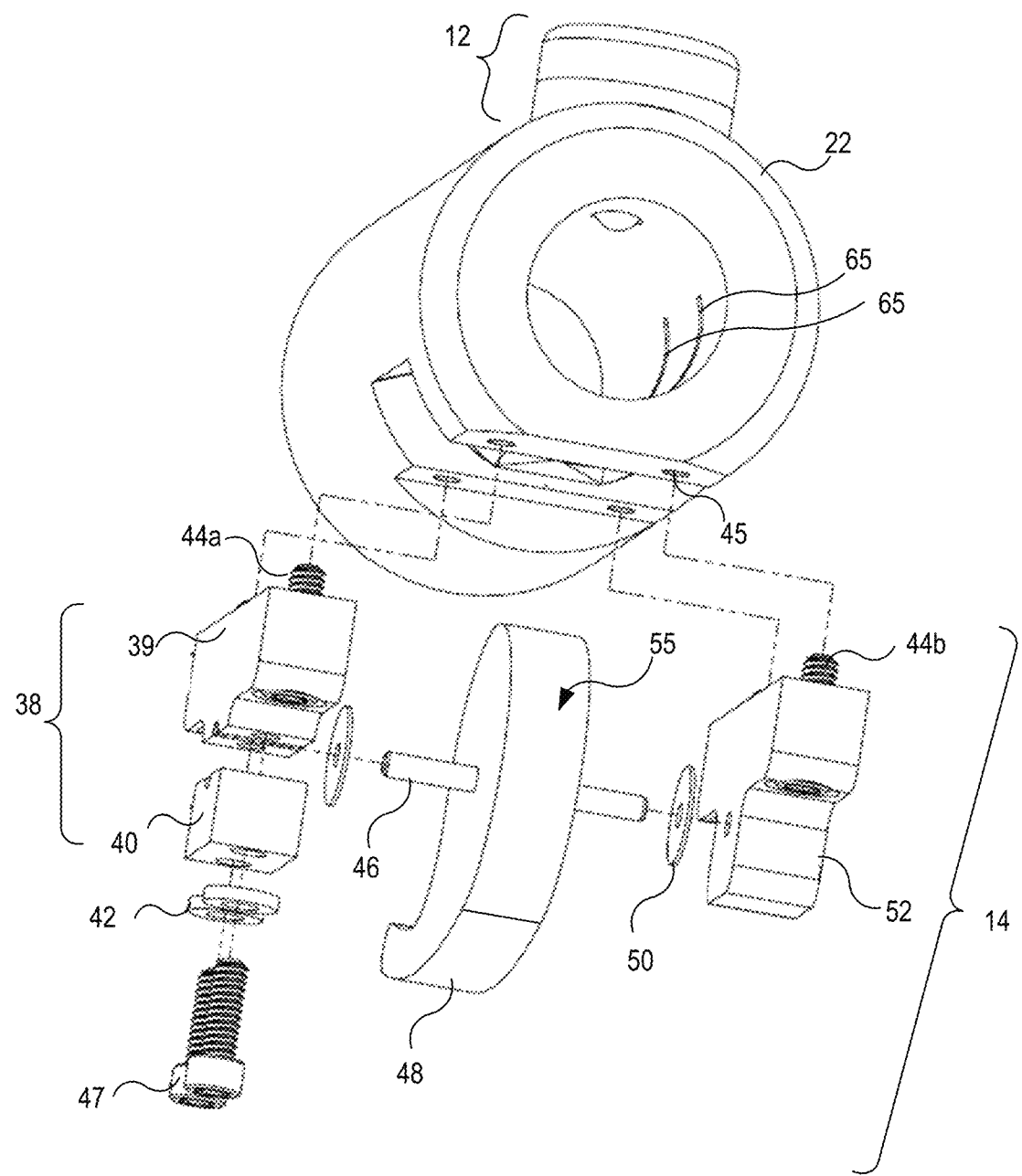
FIG. 7 shows a perspective view of a post holder, where a levered cam assembly is in an exploded view according to embodiments of the present disclosure.

FIG. 7 shows a perspective view of the post holder 11, where a levered cam assembly 14 is in an exploded view according to embodiments of the present disclosure. As depicted, the levered cam assembly 14 may include: a left cam lock bracket (or shortly left bracket) 38 secured to casing 22 by a pair of screws 44a; a right cam lock bracket (or shortly right bracket) 52 secured to the casing 22 by a pair of screws 44b; a cylindrical rod/axle 46 having two ends rotatably secured to the left and right brackets, respectively; and a levered cam 48 configured to rotate along the longitudinal axis of the cylindrical rod 46 and having a side surface 55 that is in contact with the clamping flag 60 (shown in FIGS. 4 and 9A-10B). In embodiments, the cylindrical rod 46 may be a dowel pin. Also, in embodiments, the casing 22 may include four tapped holes 45 that the two pairs of screws 44a and 44b engage.

In embodiments, in order to keep the levered cam 48 centered between the left and right brackets and prevent the levered cam from binding on the left or right bracket, anti-friction disks 50 may be added between the levered cam and the two brackets. In embodiments, the left bracket 38 may include: a left cam lock bracket bottom 39; a left cam lock bracket top 40; and a pair of screws 47 that secure the left cam lock bracket top 40 to the left cam lock bracket bottom 39. In embodiments, each of the left cam lock bracket bottom 39 and left cam lock bracket top 40 may include a groove so that, when the left cam lock bracket top is secured to the left cam lock bracket bottom by the pair of screws 47, these two grooves form a cylindrical hole for receiving the cylindrical rod 46. In embodiments, two washers 42 may be disposed between the left cam lock bracket top 40 and the pair of screws 47. In embodiments, the three pairs of screws 44a, 44b and 47 may be socket head cap screws. But, it should be apparent to those of ordinary skill in the art that other suitable types of fasteners may be used in place of them. In embodiments, the left cam lock bracket 38 may be formed in one integral body as the right cam lock bracket 52. In embodiments, the left cam lock bracket 38, right cam lock bracket 52, washers 42, screws 44a, 44b and 47, cylindrical rod 46, and anti-friction shims 50 may be formed of aluminum, aluminum, stainless steel, stainless steel, stainless steel, and polytetrafluoroethylene (PTFE), respectively.

Figure 8:
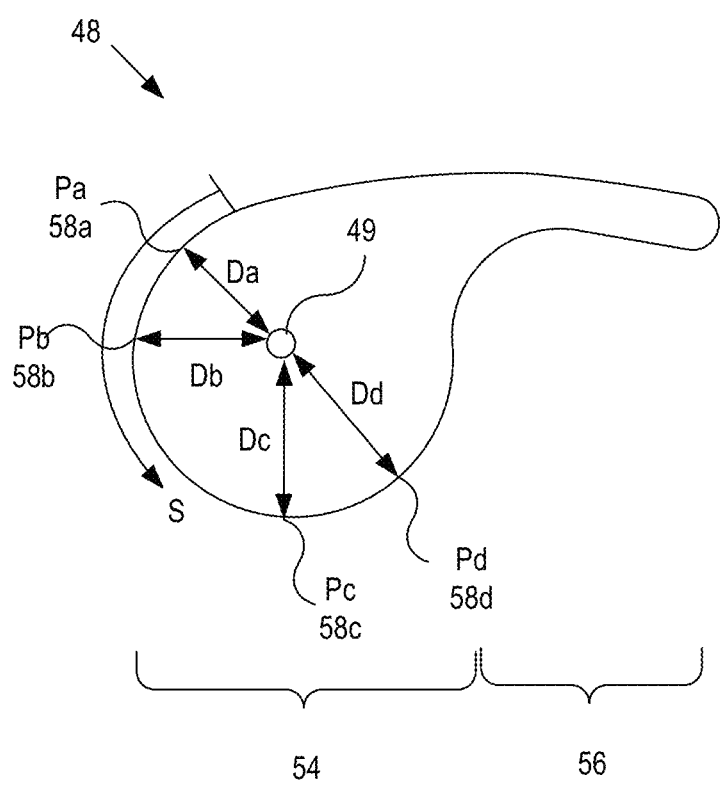
FIG. 8 shows a front view of a levered cam according to embodiments of the present disclosure.

FIG. 8 shows a front view of the levered cam 48 according to embodiments of the present disclosure. As depicted, the levered cam 48 may generally have a comma shape and include: a circular disk 54 and a tail 56. In embodiments, the circular disk 54 may have a pivot hole (or shortly hole) 49, where the cylindrical rod 46 passes through the hole 49. In embodiments, the hole 49 is slightly offset from the center of the circular disk 54 so that the distance from the hole 49 to the side surface 55 of the levered cam 48 increases as the distance S from a reference point increases. For instance, Da, Db, Dc, and Dd in FIG. 8 may represent the distances from the hole 49 to the four points Pa 58a, Pb 58b, Pc 58c, and Pd 58d, respectively, where the levered cam 48 may be rotated to contact the casing 22 at (and near) the four points at three different operational positions, respectively (as explained in conjunction with FIGS. 11A-14C). In embodiments, the user's finger may hold the tail 56 to rotate the lever cam 48 along the longitudinal axis of the cylindrical rod 46.

Figure 9A:
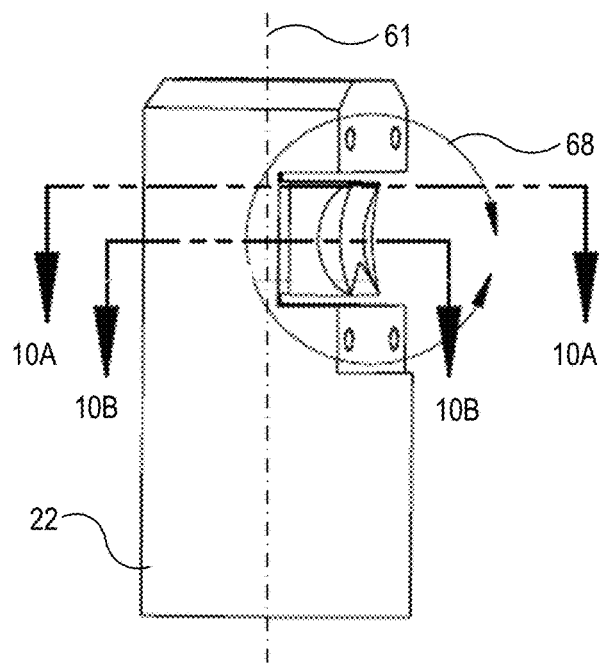
FIG. 9A shows a side view of a casing according to embodiments of the present disclosure.
Figure 9B:
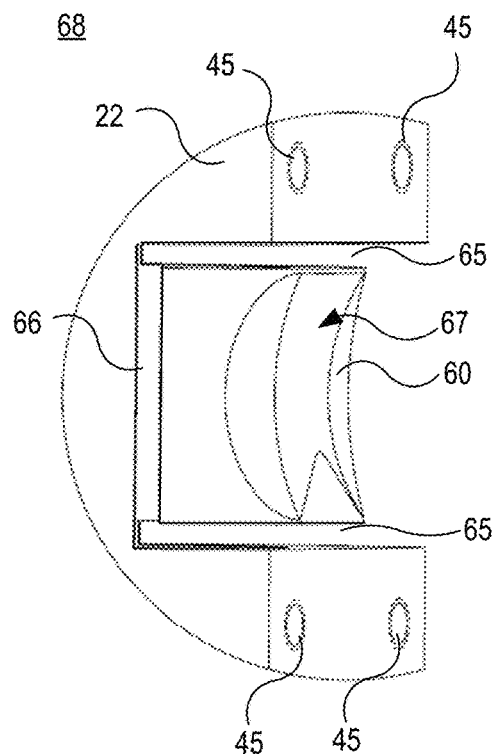
FIG. 9B shows an enlarged side view of a portion of the casing in FIG. 9A according to embodiments of the present disclosure.
Figure 9C:
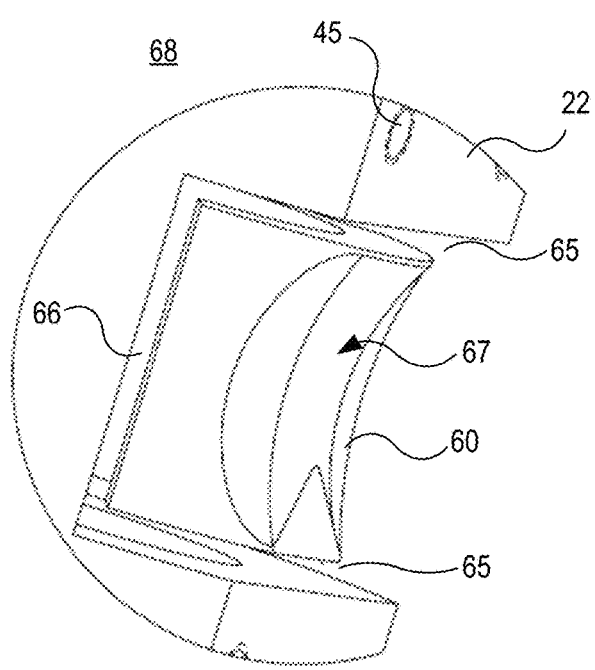
FIG. 9C shows an enlarged perspective view of a portion of the casing in FIG. 9A according to embodiments of the present disclosure.
Figure 10A:
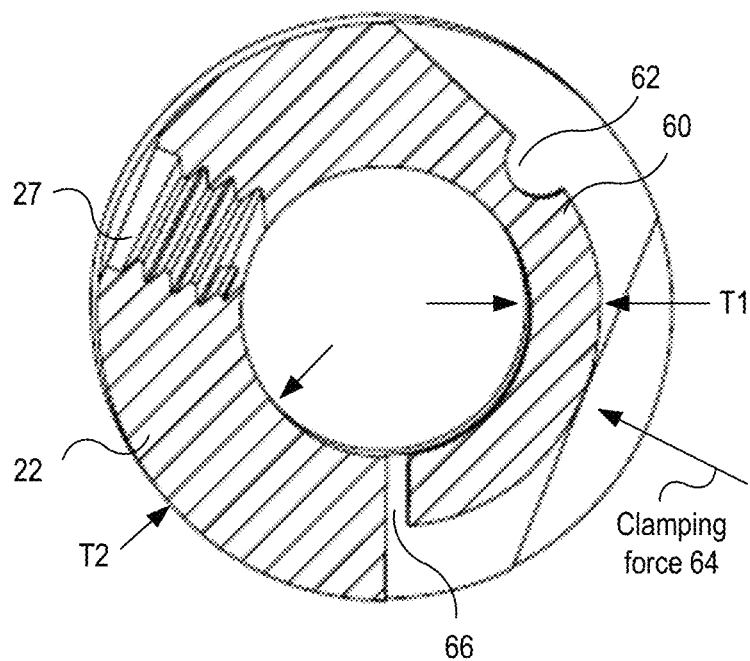
FIG. 10A shows a cross sectional view of the casing in FIG. 9A, taken along the line 10A-10A, according to embodiments of the present disclosure.
Figure 10B:
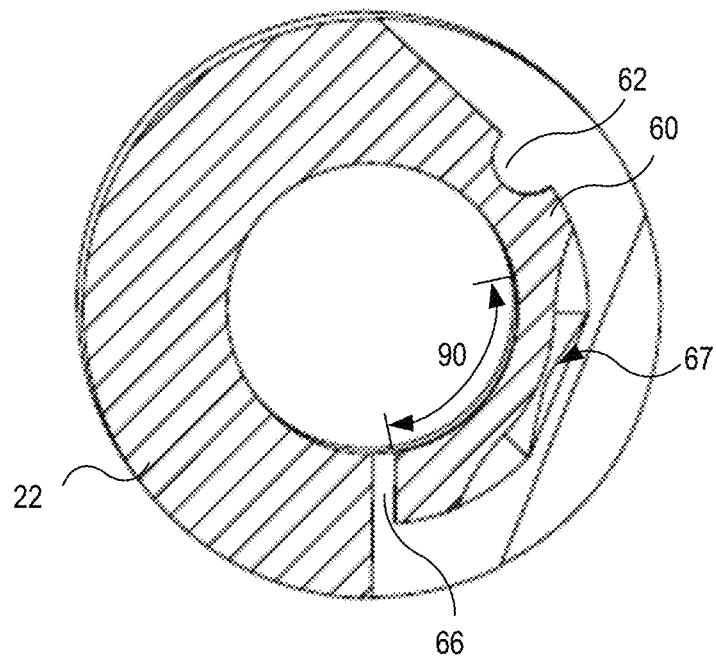
FIG. 10B shows a cross sectional view of the casing in FIG. 9A, taken along the line 10B-10B, according to embodiments of the present disclosure.

FIG. 9A shows a side view of the casing 22 according to embodiments of the present disclosure. FIG. 9B shows an enlarged side view of a portion 68 of the casing 22 in FIG. 9A according to embodiments of the present disclosure. FIG. 9C shows an enlarged perspective view of the portion 68 of the casing 22 in FIG. 9A according to embodiments of the present disclosure. FIG. 10A shows a cross sectional view of the casing 22 in FIG. 9A, taken along the line 10A-10A, according to embodiments of the present disclosure. FIG. 10B shows a cross sectional view of the casing 22 in FIG. 9A, taken along the line 10B-10B, according to embodiments of the present disclosure. For the purpose of illustration, the adjustable friction assembly 12 and the levered cam assembly 14 are not shown in FIGS. 9A-10B.

As depicted, a flag shaped portion (hereinafter, clamping flag) 60 may be defined by a generally C-shaped slit/cutout formed in the casing 22. In embodiments, the C-shaped slit/cutout may have two circumferential slits (or cutouts) 65 extending along the circumferential direction of the casing 22 and one vertical slit (or cutout) 66 extending along the longitudinal direction 61 of the casing 22. In embodiments, the clamping flag 60 may bend inward (or a radial direction of the casing 22) to clamp the post 200 when a clamping force 64 is applied by the levered cam 48. In embodiments, the outer surface of the clamping flag 60 may be carved out to form a rubbing surface 67, where the side surface 55 of the levered cam 48 contacts the rubbing surface 67 to apply the clamping force 64. In embodiments, the rubbing surface 67 may be convex (curved outward) in the lateral direction as shown in FIG. 10B to insure that, as the slide surface 55 moves past rubbing surface 67, the side surface can make contact with only one point on the rubbing 67 at a time minimizing friction and heat as the levered cam 48 is being rotated into the locking position. In embodiments, as shown in FIG. 14C below, the rubbing surface 67 may be concave (i.e., curved inward) in the longitudinal direction 61 to conform to the convex curvature of the side surface 55 of the levered cam 48. In embodiments, when in the fully locked position, it can be seen that the side surface 55 and rubbing surface 67 may be mating in such a way that there is continuous contact and the centers of curvature from the longitudinal arcs for these two surfaces are at the same point in space. In embodiments, the clamping flag 60 may resume its original shape when the clamping force 64 is removed by rotating the levered cam 48 to the release position (shown in FIG. 11A-11C), i.e., the clamping flag 60 may operate as a cantilever spring. In embodiments, to reduce the spring constant of the clamping flag 60, the thickness T1 of the clamping flag 60 may be reduced, i.e., the thickness T1 is less than the thickness T2 of the casing 22. In embodiments, the clamping flag 60 may include a notch/groove 62 (also shown in FIG. 4) that extends along the longitudinal direction 61, where the clamping flag 60 may pivot around the groove 62 when the clamping flag 60 acts as a cantilever spring. The resilient force of the clamping flag 60 may be determined by the thickness T1 as well as the size and shape of the groove 62.

FIG. 11A shows a top view of the post holder 11 in a release position according to embodiments of the present disclosure. FIG. 11B shows a cross sectional view of the post holder 11 in FIG. 11A, taken along the line 11B-11B, according to embodiments of the present disclosure. FIG. 11C is an enlarged view of a portion 70 of the post holder 11 according to embodiments of the present disclosure.

As depicted, the levered cam 48 may be rotated to the release position, i.e., the side surface 55 of the levered cam 48 does not contact the rubbing surface 67 of the clamping flag 60. Since the levered cam 48 does not contact the clamping flag 60 in the release position, the levered cam 48 does not apply any clamping force to the clamping flag 60. In embodiments, the post 200 may be held in place by the frictional/positioning/holding force applied by the adjustable friction assembly 12. In embodiments, as explained in conjunction with FIG. 8, the point Pa 58a may be located near the middle portion of the clamping flag 60, where the distance Da between the hole 49 and Pa 58a may be determined such that the side surface 55 of the levered cam 48 is not in contact with the rubbing surface 67 of the clamping flag 60.

FIG. 12A shows a top view of the post holder 11 in an engaging position according to embodiments of the present disclosure. FIG. 12B shows a cross sectional view of the post holder 11 in FIG. 12A, taken along the line 12B-12B, according to embodiments of the present disclosure. FIG. 12C is an enlarged view of a portion 72 of the post holder 11 in FIG. 12B according to embodiments of the present disclosure. As depicted, the levered cam 48 may be rotated to an engaging position where the side surface 55 of the levered cam 48 slightly contacts the rubbing surface 67 of the clamping flag 60 near the point Pb 58b. Since the levered cam 48 slightly contacts the clamping flag 60, the levered cam 48 may apply a low level of the clamping force 64 to the clamping flag 60. In embodiments, as explained in conjunction with FIG. 8, the distance Db between the hole 49 and Pb 58b may be determined such that the levered cam 48 slightly touches the rubbing surface 67 of the clamping flag 60.

Figure 13A:
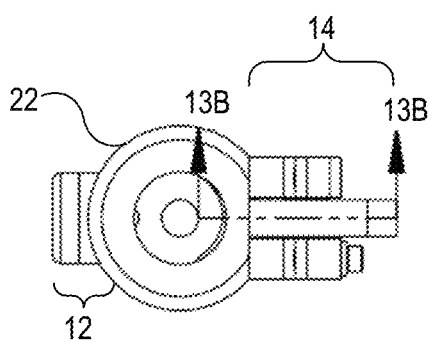
FIG. 13A shows a top view of a post holder in a locking position according to embodiments of the present disclosure.
Figure 13B:
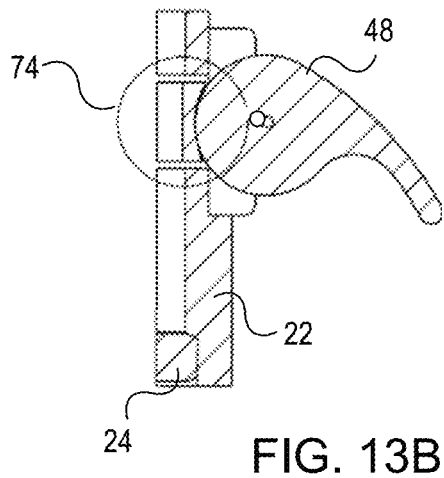
FIG. 13B shows a cross sectional view of the post holder in FIG. 13A, taken along the line 13B-13B, according to embodiments of the present disclosure.
Figure 13C:
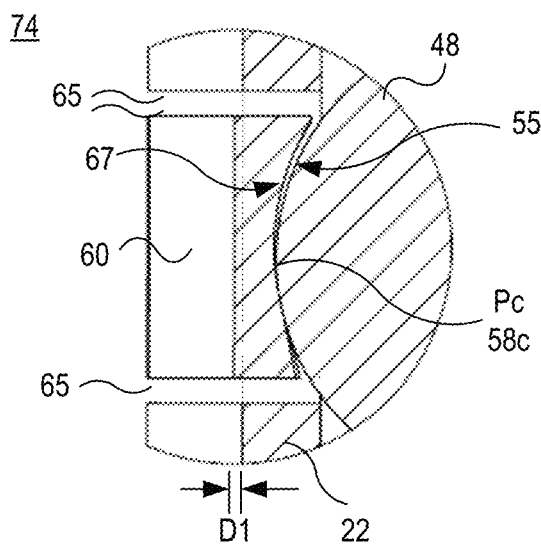
FIG. 13C is an enlarged view of a portion of the post holder in FIG. 13B according to embodiments of the present disclosure.

FIG. 13A shows a top view of the post holder 11 in a locking position according to embodiments of the present disclosure. FIG. 13B shows a cross sectional view of the post holder 11 in FIG. 13A, taken along the line 13B-13B, according to embodiments of the present disclosure. FIG. 13C is an enlarged view of a portion 74 of the post holder 11 in FIG. 13B according to embodiments of the present disclosure. As depicted, the levered cam 48 may be rotated to a locking position where the side surface 55 of the levered cam 48 may be in firm contact with the rubbing surface 67 of the clamping flag 60 near the point Pc 58c and push the clamping flag inward. In embodiments, the levered cam 48 may apply a high level of clamping force 64 to the clamping flag 60 in the locking position. In the locking position, the clamping flag 60 may bend inward by the distance D1 due to the clamping force 64, to thereby lock the post 200 in place. In embodiments, as explained in conjunction with FIG. 8, the distance Dc between the hole 49 and Pc 58c may be determined such that the levered cam 48 may make the clamping flag 60 bend inward to lock the post in place.

Figure 14A:
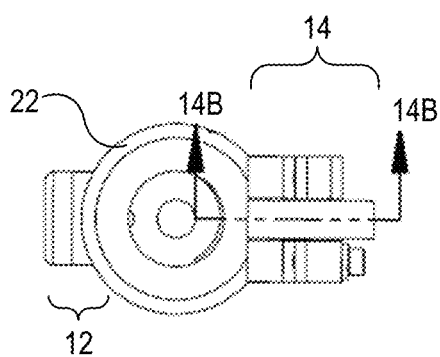
FIG. 14A shows a top view of a post holder in a fully locked position according to embodiments of the present disclosure.
Figure 14B:
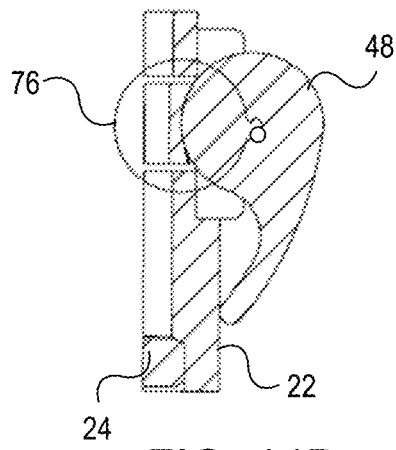
FIG. 14B shows a cross sectional view of the post holder in FIG. 14A, taken along the line 14B-14B, according to embodiments of the present disclosure.
Figure 14C:
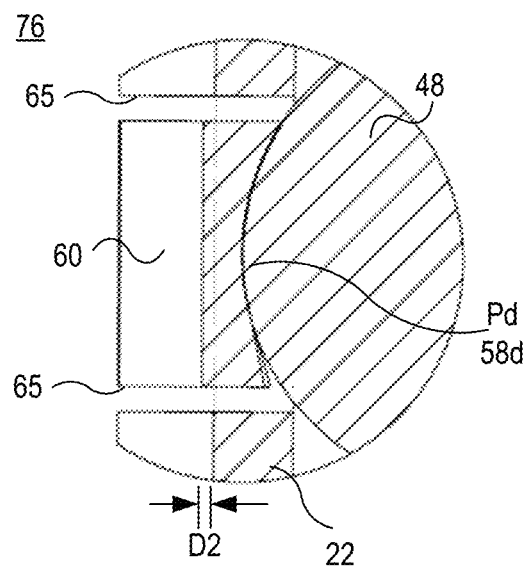
FIG. 14C is an enlarged view of a portion of the post holder in FIG. 14B according to embodiments of the present disclosure.

FIG. 14A shows a top view of the post holder 11 in the fully locked position according to embodiments of the present disclosure. FIG. 14B shows a cross sectional view of the post holder 11 in FIG. 14A, taken along the line 14B-14B, according to embodiments of the present disclosure. FIG. 14C is an enlarged view of a portion 76 of the post holder 11 in FIG. 14B according to embodiments of the present disclosure. As depicted, the levered cam 48 may be rotated to the fully locked position where the side surface 55 of the levered cam 48 may be in tight continuous contact with the rubbing surface 67. The distance D2 and clamping force may be at their maximum and Pd 58d may be at the end of a horizontal line that starts with the axis or rotation and then hits the two surfaces' (55 and 67) centers of curvature and ends at point Pd 58d. In embodiments, the clamping flag 60 may be pushed inward at the point Pd 58d. In embodiments, the levered cam 48 may apply the maximum level of clamping force 64 to the clamping flag 60 in the fully locked position. In the fully locked position, the clamping flag 60 may bend inward by the distance D2 due to the clamping force 64 (where D2 may be equal to or larger than D1), to fully lock the post 200 in place. In embodiments, as explained in conjunction with FIG. 8, the distance Dc between the hole 49 and Pd 58d may be determined such that the levered cam 48 may make the clamping flag 60 bend inward to fully lock the post in place.

In embodiments, the end of the tail 56 where the finger of the operator applies a force may travel about 1.75 inches from the position it makes contact with the clamping flag (i.e., the engaging position in FIGS. 12A-12C) to the fully locked (down) position (i.e., the locking position in FIGS. 14A-14C), and, during this travel of the tail 56, the levered cam 48 may move (or attempt to move) the clamping flag 60 inward by 0.020 inches (i.e. D2 is about 0.02 inches), applying the clamping force on the post 200.

In embodiments, in order to minimize the potential of galling caused by adhesion between the two sliding surfaces, i.e., the rubbing surface 67 of the clamping flag 60 and the side surface 55 of the levered cam 48, the levered cam 48 may be formed of heat hardened low carbon steel with a hard black oxide finish and the rubbing surface 67 may be given a Teflon coating.

In embodiments, the adjustable friction assembly 12 may provide a constant friction that is separate from the clamping force 64 generated by the levered cam 14. As discussed above, the level of the constant frictional force applied by the adjustable friction assembly 12 may be adjusted and locked by the operator, and the level of the frictional force (i.e., holding pressure) may not change based on the position of the levered cam 48. In embodiments, the adjustable friction assembly 12 may hold the post 200 in place while the levered cam 48 is in the release position (shown in FIGS. 11A-11C). In embodiments, these two separate clamping mechanisms 12 and 14 may allow the operator to use only one hand when the operator changes the post 200.

In the existing post holder 100, the post is clamped by the end of the thumb screw 104. Since the end of the thumb screw 104 is typically a circular ridge 122 surrounding a ball plunger 109 and the clamping force is focused on the top and bottom of the ridge 122 that makes contact with the post 120, the two points where the post is in contact with the ridge 122 may be damaged by the thumb screw and/or the post may rotate during the locking process. In contrast, in embodiments, a portion 90 (shown in FIG. 10B) of the inner surface of the clamping flag 60 may be used to hold the post 200 when the clamping flag 60 is bent inward by the levered cam 48 as described in conjunction with FIGS. 12A-14C. In embodiments, since the large non-rotating clamping area 90, which may have a curved rectangular shape, is used to hold the post 200 in place, the post 200 does not rotate or get damaged during the locking process.

Uses of the post holder 11: In embodiments, the mount—post—post holder—baseplate system in FIG. 2 may be a flexible and prolific system for positioning optics. In embodiments, the post holder 11 may allow the post 200 with a mount and optic at its top to be positioned freely within an optical system and then securely locked in place. In embodiments, the post—post holder system may also be used to hold various targets, such as lasers, irises, film, or any other suitable components in a laser lab that need to be freely positioned on an optical table.

In embodiments, the post 200 and post holder 11 (hereinafter, post holder system), when combined with accessories like post 90 degree elbows, may be used to construct a barrier to protect critically aligned optics in high traffic areas near the edge of optical tables. In embodiments, four post holders 11 may be mounted facing downward on a small optical breadboard and then mated to four identically spaced posts screwed into a lager breadboard to form a low cost lab jack. In embodiments, the ability of the post holder 11 to set the holding friction may make this configuration quite practical. In embodiments, in the field of chemistry or biology, the post holder system may be combined with clamps to hold test tubes or beakers. In embodiments, small LED lights may be held by the post 200 to aluminate small electronic components or bugs that are being examined with a microscope or eye loop or magnified glass. In embodiments, the post holder 11 may allow for vertical (Y direction) and rotational adjustments. In embodiments, the post holder 11 may also connect the post 200 and mount (such as lens holder 102) to a base plate that allows for translation and focus (X and Z directions) adjustments.

In embodiments, the post holder 11 may provide several advantages over the existing post holders: (1) the operator may be able to tell if the post is locked or free to move, based on the position of the levered cam 48; (2) if the levered cam 48 is down (i.e., in the fully locked position), then the operator may know that sufficient clamping force is being applied to the post 200; (3) a large clamping area may be used so that the post 200 does not rotate or get damaged during the locking process; (4) when the levered cam 48 is up (i.e., in the release position), the post holder 11 is ready to accept a new post, and only one hand is needed to replace the post; and (5) the adjustable friction assembly 12 may generate a frictional force separately from the levered cam assembly 14, and the frictional force may be adjusted and locked, and will not change based on the position of the levered cam 48.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A post holder, comprising:
    a casing including a hollow cylinder and a clamping flag defined by a cutout formed in the hollow cylinder;
    first and second brackets detachably secured to the casing;
    a cylindrical rod disposed between the first and second brackets and secured to the first and second brackets; and
    a levered cam disposed between the first and second brackets and having a shape of a comma that includes a tail and a circular disk, the circular disk having a hole that the cylindrical rod passes through, the hole being offset from a center of the circular disk so that a level of a clamping force that the circular disk applies to the clamping flag changes as the levered cam rotates relative to the casing.

2. The post holder of claim 1, wherein the cutout includes a first slit that extends along a circumferential direction of the hollow cylinder, a second slit that is parallel to the first slit, and a third slit that extends along a longitudinal direction of the hollow cylinder and wherein the third slit has two ends that meet the first and second slits, respectively.

3. The post holder of claim 1, wherein the clamping flag bends inward in response to the clamping force, to thereby hold a post received in the hollow cylinder in place.

4. The post holder of claim 1, wherein a thickness of the clamping flag in a radial direction of the hollow cylinder is less than a thickness of the hollow cylinder in the radial direction.

5. The post holder of claim 1, wherein the clamping flag has a groove that extends along a longitudinal direction of the hollow cylinder and wherein the clamping flag pivots around the groove in response to the clamping force.

6. The post holder of claim 1, further comprising:
    a bottom plug detachably secured to the casing and including a tapped hole.

7. The post holder of claim 1, wherein the bottom plug further includes a pair of holes for a spanner drive.

8. The post holder of claim 1, wherein the clamping flag is carved out to form a rubbing surface and wherein the rubbing surface is concave inward so as to conform to a side surface of the levered cam.

9. The post holder of claim 1, further comprising:
    a first anti friction disk disposed between the levered cam and the first bracket; and
    a second anti friction disk disposed between the levered cam and the second bracket.

10. The post holder of claim 1, wherein the first bracket includes:
    a top portion detachably secured to the casing and having a first groove; and
    a bottom portion detachably secure to the top portion and having a second groove,
    wherein the first and second grooves form a circular hole for receiving the cylindrical rod therein.

11. The post holder of claim 1, further comprising:
    an adjustable friction assembly for applying a frictional force to a post received in the hollow cylinder, the adjustable friction assembly comprising:
        a main body detachably secured to the casing and having a through hole extending in a radial direction of the hollow cylinder;
        a ball disposed in the through hole;
        a spring disposed in the through hole and configured to push the ball in the radial direction so that the ball applies the frictional force; and
        a jam nut detachably secured to the main body and having a tip that compresses the spring.

12. The post holder of claim 11, wherein the adjustable friction assembly further comprises:
    a screw detachably secured to the main body and having a tip that secures the jam nut to the main body.

13. The post holder of claim 11, wherein the adjustable friction assembly further includes:
    a spacer disposed between the casing and the main body and having a curved surface that conforms to an outer surface of the casing.

14. The post holder of claim 11, wherein main body further includes a pair of holes for a spanner drive.

15. A post holder for holding a post, comprising:
    a casing including a hollow cylinder for receiving a post therein and having a tapped hole; and
    an adjustable friction assembly for applying a frictional force to the post, the adjustable friction assembly comprising:
        a main body engaging the tapped hole in the casing and having a through hole extending in a radial direction of the hollow cylinder;
        a ball disposed in the through hole;
        a spring disposed in the through hole and configured to push the ball in the radial direction so that the ball applies the frictional force; and
        a jam nut detachably secured to the main body and having a tip that compresses the spring.

16. The post holder of claim 15, wherein the main body further includes a tapped hole and wherein the adjustable friction assembly further comprises:
    a screw engaging the tapped hole in the main body and having a tip that secures the jam nut to the main body.

17. The post holder of claim 15, wherein the adjustable friction assembly further includes:
    a spacer disposed between the casing and the main body and having a curved surface that conforms to an outer surface of the casing.

* * * * *